UNITED STATES PATENT OFFICE.

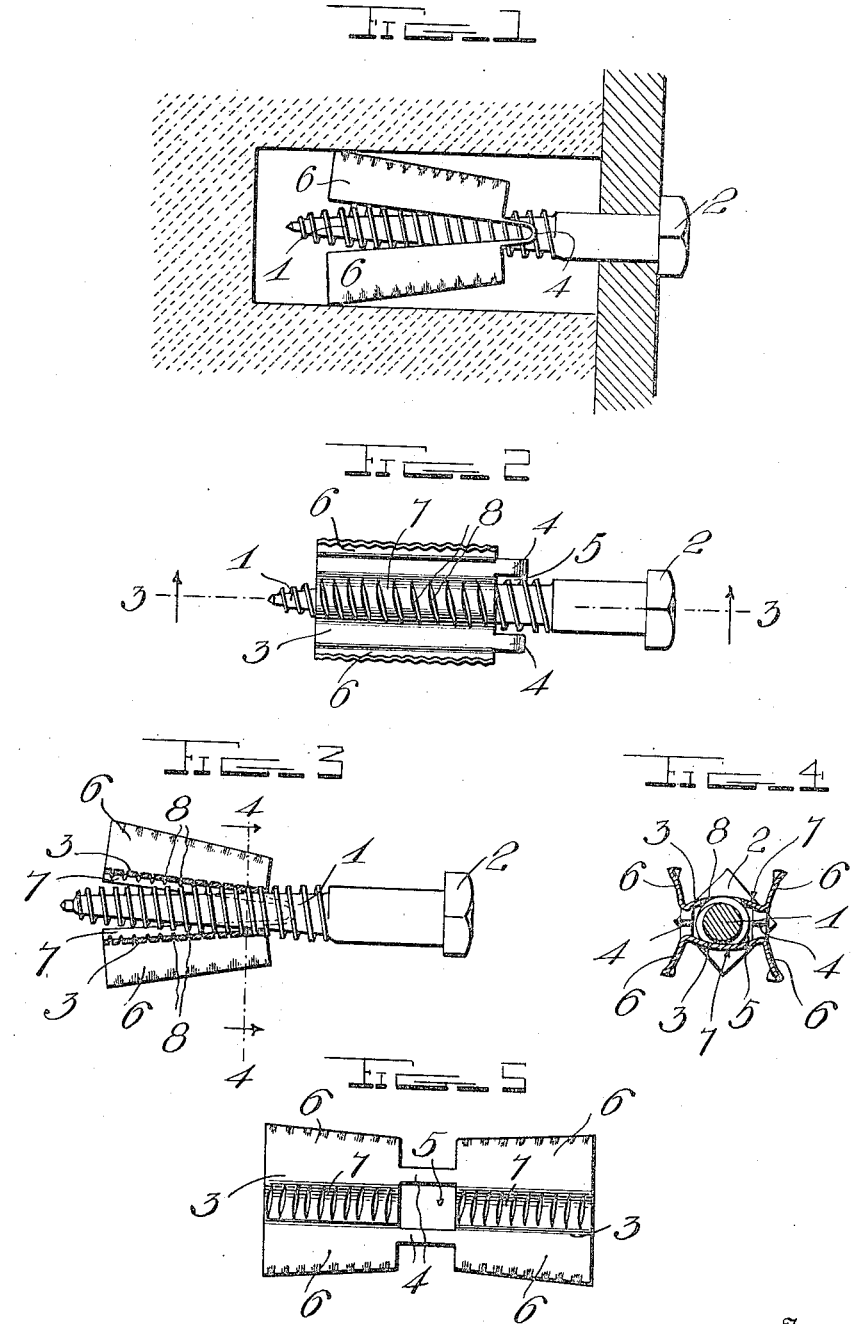

WILLIAM A. BRYANT, OF WETUMPKA, ALABAMA, ASSIGNOR OF NINE-TWENTIETHS TO JOHN A. LANCASTER AND JOHN R. GAMBLE, OF WETUMPKA, ALABAMA.

EXPANSION-BOLT.

962,306.  Specification of Letters Patent.  Patented June 21, 1910.

Application filed December 30, 1909. Serial No. 535,633.

*To all whom it may concern:*

Be it known that I, WILLIAM A. BRYANT, a citizen of the United States, residing at Wetumpka, in the county of Elmore and State of Alabama, have invented certain new and useful Improvements in Expansion-Bolts; and I do declare the following to be a full, clear, and exact description of the invention, such as will enable others skilled in the art to which it appertains to make and use the same.

This invention relates to improvements in expansion bolts.

The object of the invention is to provide a device of this character having an improved construction and arrangement of socket adapted to be expanded by the screw or bolt, thereby fastening the socket in the hole or bore whereby the bolt or screw may be securely anchored.

With the foregoing and other objects in view, the invention consists of certain novel features of construction, combination and arrangement of parts as will be more fully described and particularly pointed out in the appended claims.

In the accompanying drawings, Figure 1 is a sectional view through a stone showing the application of the invention; Fig. 2 is a plan view of the bolt and socket; Fig. 3 is an enlarged central longitudinal section of the same; Fig. 4 is an end view of the inner end of the bolt and socket; Fig. 5 is a plan view of the blank from which the socket is formed.

Referring more particularly to the drawing, 1 denotes the screw or bolt which is provided with a tapered threaded end and a suitable head 2. The socket member of the device is preferably formed from a single piece of sheet metal which is cut to form the opposite side plates 3 of the socket, said plates being connected together at their inner ends by integral connecting strips 4 between which is formed the opening 5, into which the end of the screw or bolt is inserted. The plates 3 are of greater width at their outer ends than at their inner ends and the material on the opposite edges of the plates is bent outwardly to form anchoring flanges 6, the edges of which taper from the outer ends toward the inner ends of the plates or, in other words, the flanges are of greater width at their outer ends than at their inner ends. The edges of the flanges 6 are preferably corrugated as shown to facilitate their engagement with the walls of the bore or hole with which the socket is to be engaged.

The central portion of the plates 3 is preferably provided with a curved longitudinally disposed depression or channel 7 and in the channeled surface of the plates is formed a series of diagonally arranged slits 8 which form threads and which, when the plates 3 are brought together in operative position, are adapted to be engaged by the threads of the bolt or screw 1 when the latter is inserted between the plates and by means of which said plates will be expanded owing to the tapered formation of the screw or bolt.

In arranging the socket for use, the connecting strips 4 are bent midway between the inner ends of the plates 3 so that the latter are brought into close proximity to each other whereby the slitted segmental channels 7 will form a threaded passage to receive the tapered end of the bolt or screw. The outwardly bent side edges of the plates 3 form anchoring flanges which, when the socket is inserted into the hole or bore in the article to which the bolt is to be secured, will be forced into rigid engagement with the walls of the hole or bore when the tapered end of the bolt is screwed into the passage between the plates and the latter thus expanded. When the socket has thus been engaged with and secured in the bore or hole, the bolt will be securely anchored to the article.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim as new is:—

In an expansion bolt, a socket formed from a single piece of sheet metal bent centrally upon itself to form side plates, having formed therein centrally disposed threaded segmental channels, anchoring flanges formed on the edges of said plates and projecting laterally therefrom, said flanges having tapered corrugated outer edges, flexible connecting strips to secure the inner ends of said plates together, and a bolt having a tapered threaded portion adapted to screw into the threaded channels in the plates, whereby the latter and the anchoring flanges thereon are expanded to hold the socket in rigid engagement.

In testimony whereof I have hereunto set my hand in presence of two subscribing witnesses.

WILLIAM A. BRYANT.

Witnesses:
F. LOYD TATE,
F. G. RUFFIN.